United States Patent [19]

Flodin

[11] Patent Number: 4,718,640
[45] Date of Patent: Jan. 12, 1988

[54] APPARATUS FOR CONTAINER HANDLING

[75] Inventor: Karl B. Y. Flodin, Halmstad, Sweden

[73] Assignee: Hydraulik-Konsult Yngve Flodin Aktiebolag, Halmstad, Sweden

[21] Appl. No.: 773,889

[22] Filed: Sep. 9, 1985

[30] Foreign Application Priority Data

Sep. 19, 1984 [SE] Sweden ............................... 8404686

[51] Int. Cl.⁴ ............................................... B66F 7/26
[52] U.S. Cl. ...................................................... 254/45
[58] Field of Search ..................... 254/45, 93 R, 93 H, 254/89 H, 423; 414/495, 498; 91/420, 422

[56] References Cited

U.S. PATENT DOCUMENTS

| | | | |
|---|---|---|---|
| 2,665,938 | 1/1954 | McCrossen | 414/498 X |
| 3,460,697 | 2/1968 | Cowlishaw et al. | |
| 3,541,598 | 11/1970 | Dousset | 254/45 X |
| 3,641,875 | 2/1972 | Kodalle | 91/422 X |
| 3,749,363 | 7/1973 | Hauser | 254/45 |
| 3,773,199 | 11/1973 | Arvidsson | 254/45 X |
| 4,045,000 | 8/1977 | Mai | 254/45 |

FOREIGN PATENT DOCUMENTS

| | | |
|---|---|---|
| 2135371 | 8/1972 | Fed. Rep. of Germany . |
| 511670 | 8/1939 | United Kingdom ................ 254/423 |
| 1168903 | 10/1969 | United Kingdom ................ 414/498 |
| 1244804 | 9/1971 | United Kingdom . |

Primary Examiner—Robert C. Watson
Attorney, Agent, or Firm—Shapiro and Shapiro

[57] ABSTRACT

Apparatus for lifting a container of the standard type having connecting boxes at least at the lower ends of its vertical corners comprises at least four separate hydraulic lifting devices which are jointly connectible to a hydraulic pump. Each of the lifting devices includes a piston and cylinder releasably connectible to one of the four container corner end boxes to permit lifting of the container when the piston rod, serving as a supporting leg, is standing on the group. Each lifting device is connected to the container via an intermediate member of a connecting device which includes clamping mechanisms for releasably clamping the intermediate member to the lifting cylinder and to the lower container corner end box, and a lockable hinge mechanism permitting the intermediate member and thereby the lifting device to be pivoted through an angle of 180° from an operative to a rest position and vice versa. The connecting device is disconnectible from the container so that the lifting device can be removed from the container and stowed in an appropriate space on the vehicle.

3 Claims, 9 Drawing Figures

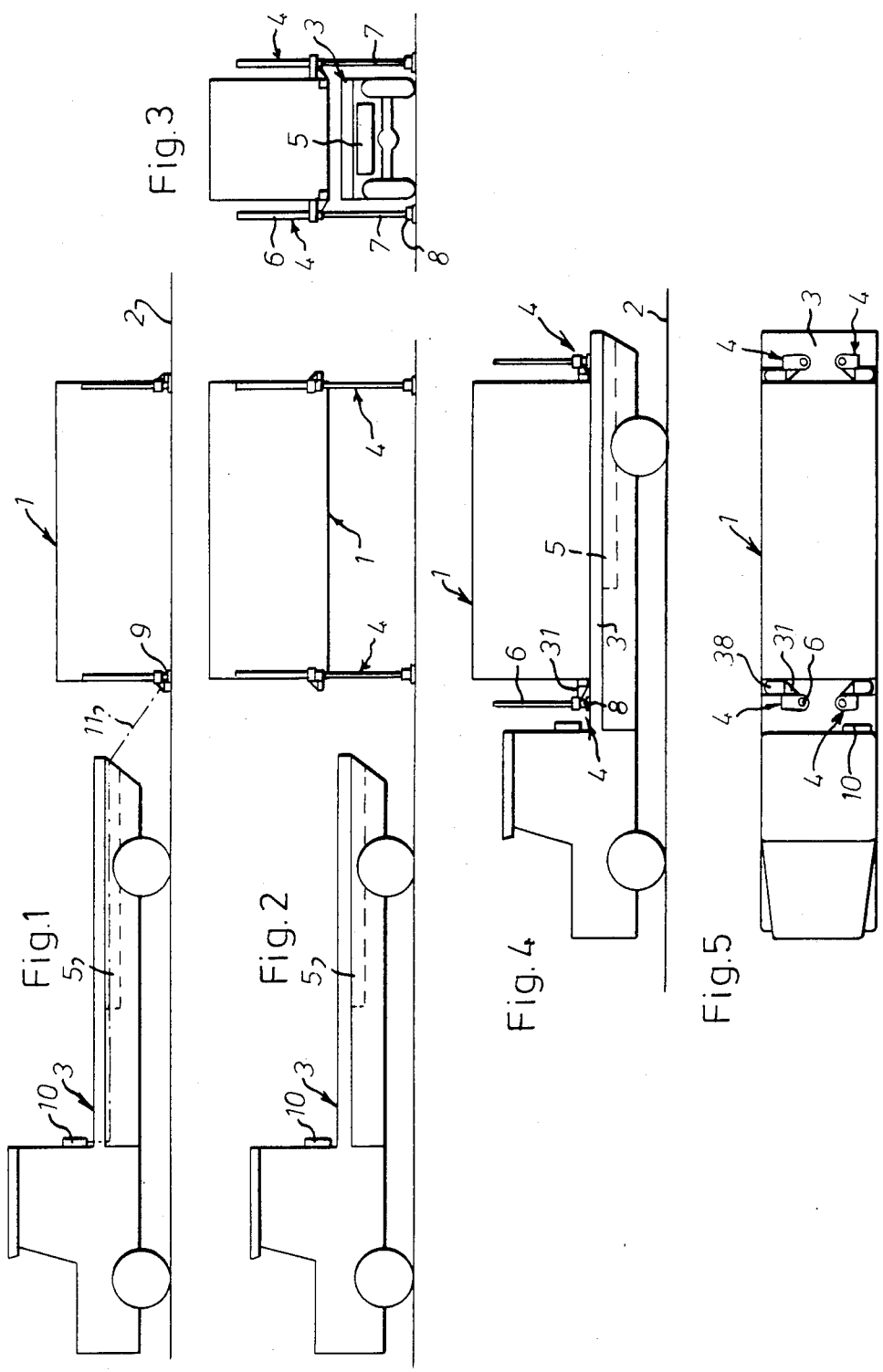

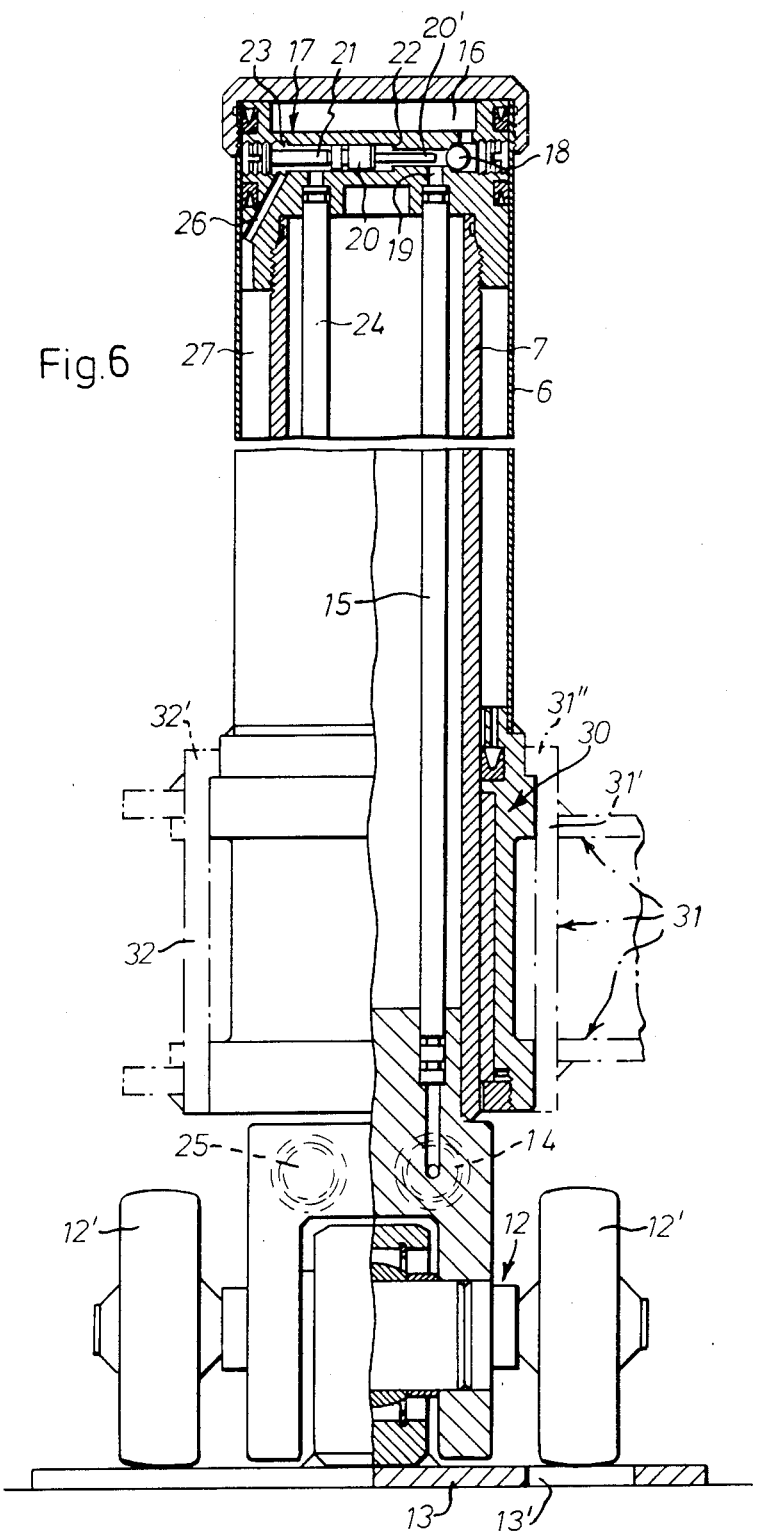

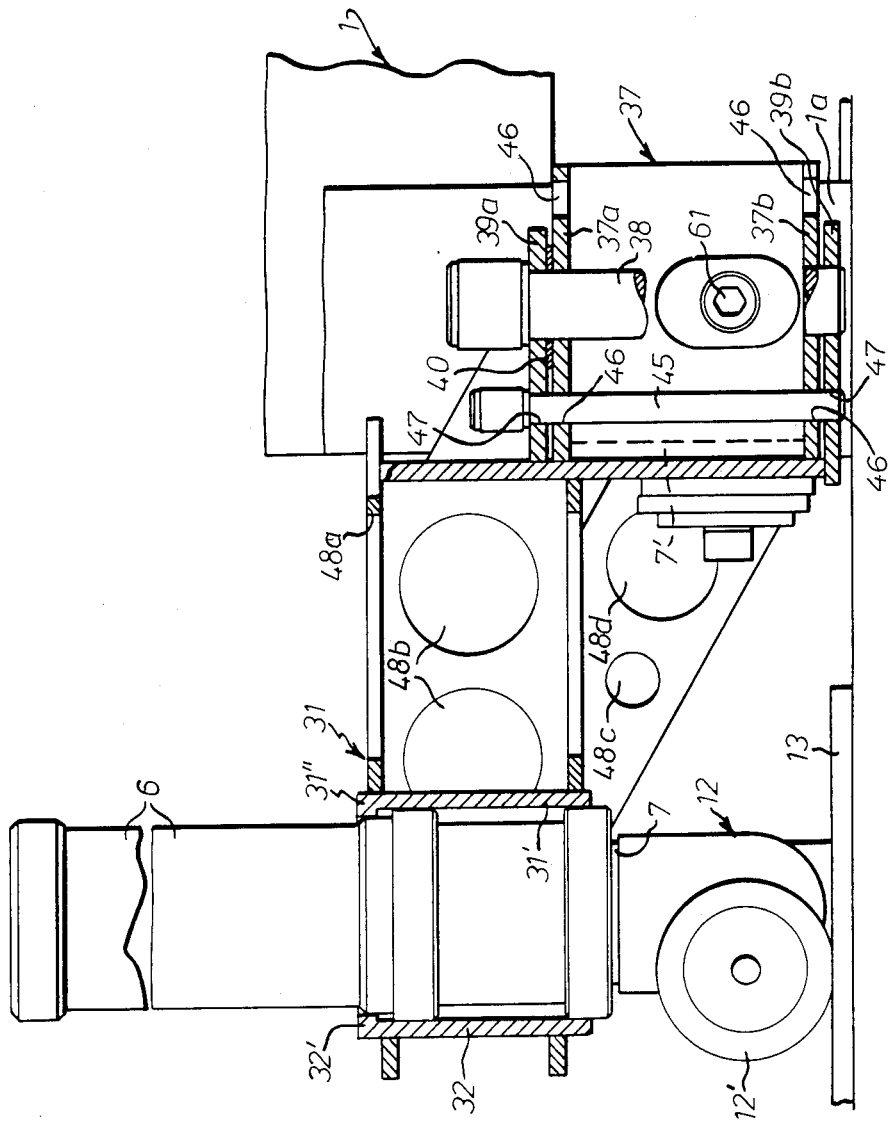

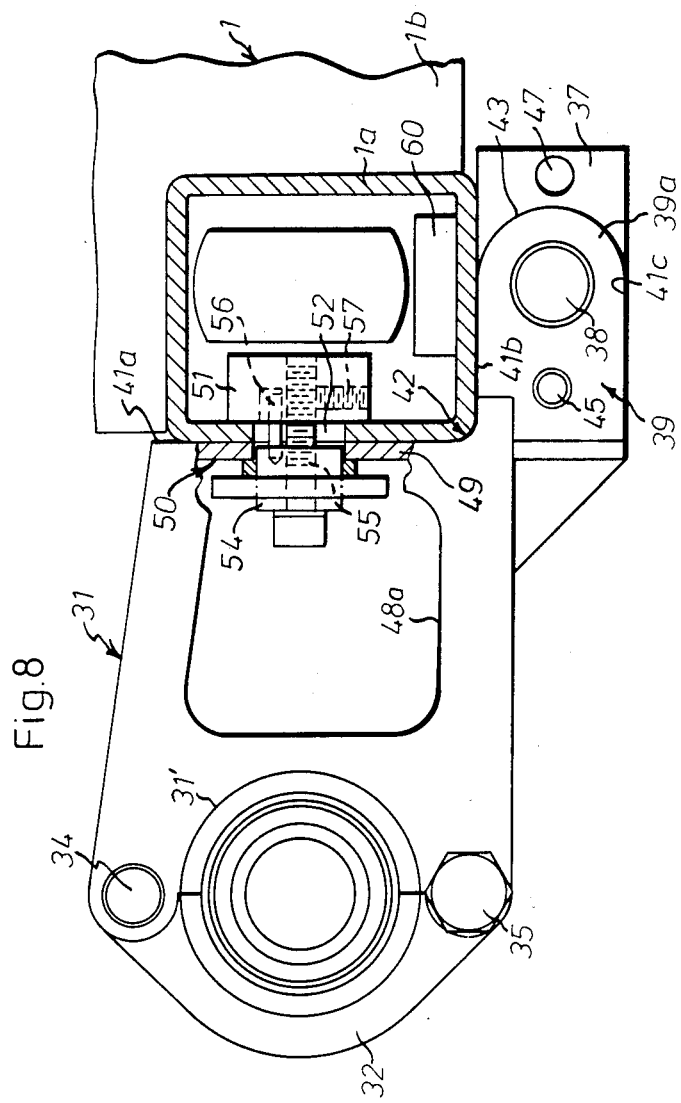

APPARATUS FOR CONTAINER HANDLING

The invention relates to apparatus for handling (specifically, raising and lowering) a container during the loading and unloading thereof onto and from a transport vehicle, the container being of the type having lower corner connecting boxes at its four vertical corners.

Though most of the conventional container-handling apparatus still are relatively bulky lifting mechanisms fitted with lifting beams or special facilities for gripping such special load as containers, also special container-handling mechanisms have been provided, such as those described in U.S. Pat. No. 3,460,697 and G B No. 1,244,804 which are adapted to be removably received on a transport vehicle and comprise devices having hydraulic legs for lifting the container from underneath, such as via an understructure, or at the ends of the container.

Furthermore, according to DE-OS No. 2,135,371 and the corresponding Swedish Patent, SE No. 369,293, a container load appliance is known which comprises a set of four hydraulic jacks each having a cylinder of a length equal to the height of the container to be lifted, and each cylinder comprising means at opposite ends thereof for connecting the cylinder with the conventional top and bottom connecting boxes at the ends of each vertical corner of a conventional standard type container. After connection of the four hydraulic jacks with the four vertical corners of the container, the corners, and thus the container, can be lifted by moving the hydraulic jack cylinders upwardly in relation to legs standing on the ground and connected to the pistons within the cylinders. When the container has been lifted, the transport vehicle can be moved-in under the container. Then the latter can be lowered and seated on the vehicle and the legs withdrawn upwardly and fixed to the jacks still connected to the container corners and extending outwardly from the container ends or the longitudinal sides thereof.

These known container-handling and loading appliances are bulky, heavy and cumbersome. Another drawback, such as in the case of the appliance according to DE-OS No. 2,135,371, is that the hydraulic jacks, when connected to the container during the transport thereof, will decrease the accessible load support area of the vehicle since it is not possible to place two containers closely side by side or end to end on the vehicle because of the outwardly extending vertical jack cylinders.

A further drawback is that these jacks are not accessible to be used for loading or unloading of another container when connected to the loaded container during transport thereof on the vehicle and, because of their heavy weight, the jacks are not suited to be handled, such as lifted, by one operator without the assistance of hydraulic or mechanical means.

It is an object of the invention to provide for and facilitate loading and unloading operations in cases where neither terminal-based container handling devices not powerful vehicle-borne cranes are available to the driver or other operators of transport vehicles for loading and unloading of containers. A special object of the invention is to overcome or reduce drawbacks of the kind described above and to provide a loading and unloading apparatus which comprises simple, handy lifting devices which can relatively easily be handled, connected and disconnected by one man and which, when disconnected from a container, can easily be lifted away from the container to be stowed in an appropriate space on the vehicle for transport thereon but readily accessible when needed.

A further object of the invention is to provide an apparatus comprising relatively light weight and simple but efficient lifting devices, by means of which loaded contaienrs can be lifted from the ground and placed on a transport vehicle or another load-carrier, for example a pallet, and vice versa, in such an easy and labor-saving manner that the loading and unloading operations can be carried out by one person, for example the driver of the vehicle, in a manner which fully meets any accident control regulations.

More particularly stated, the present invention provides apparatus for lifting a container of the type having four vertical end corners, each having at least a lower corner connecting box, and placing the container on a movable load-carrier and for lifting the container resting on the load-carrier and placing it on a base, such as the ground. The apparatus comprises at least four lifting devices mechanical connecting devices for connecting each of said lifting devices to said container, and conduit means for connecting said hydraulic lifting devices to a power supply. Each of said lifting devices comprises a hydraulic piston and cylinder assembly including a rod fixed to the piston of each cylinder and extending out of the cylinder for serving as a retractable supporting leg. Each mechanical connecting device comprises an intermediate member, clamping means supported by one end of said intermediate member for clamping the latter to the respective lifting cylinder, and releasable attachment means supported by an opposite end of said intermediate member for releasably connecting the latter mechanically to said lower container end box. The attachment means includes connectible and releasable clamping members for clamping said intermediate member to said container corner end box, securing means for securing said clamping members in the clamped condition, and hinge means comprising relatively pivotable and disconnectible hinge members for permitting pivotable movement of said intermediate member when said clamping members are released from each other and thereby pivoting movement of the respective lifting device between two angularly spaced operative and rest positions, respectively, and for permitting disconnection of said intermediate member and thereby said lifting device from said container.

In order that the invention and the advantages thereof be well understood, a preferred embodiment according to the invention will now be described, by way of an example only, reference being had to the accompanying drawings in which:

FIG. 1 is a schematic side elevational view of a transport vehicle and a container and illustrates the initial phase for lifting the container by means of the hydraulic lifting devices according to the invention and supplied with power from the vehicle;

FIG. 2 is a view similar to FIG. 1 but illustrates the container in a raised position and after disconnection of the conventional hydraulic system on the vehicle from the hydraulic cylinders of the lifting devices;

FIG. 3 is an end view of the raised container in FIG. 2 and shows the rear end of the lifting vehicle whose loading platform is located under the container in a loading or unloading phase for placing the container on the vehicle or removing the vehicle from beneath the container and placing the container on the ground;

FIG. 4 is a schematic side elevational view of the transport vehicle with the container and the lifting devices placed on the vehicle platform;

FIG. 5 is a plan view of the transport vehicle, the container and the lifting devices shown in FIG. 4;

FIG. 6 is a detailed end view, partly in vertical section, of a lifting device according to the invention;

FIG. 7 is a side elevational view of the lifting device shown in FIG. 6 and illustrates, in vertical section, the means for releasably connecting the lifting device to the container;

FIG. 8 is a plan view, partly in section, of the lifting device and the connecting means shown in FIG. 7.

Figure 9:
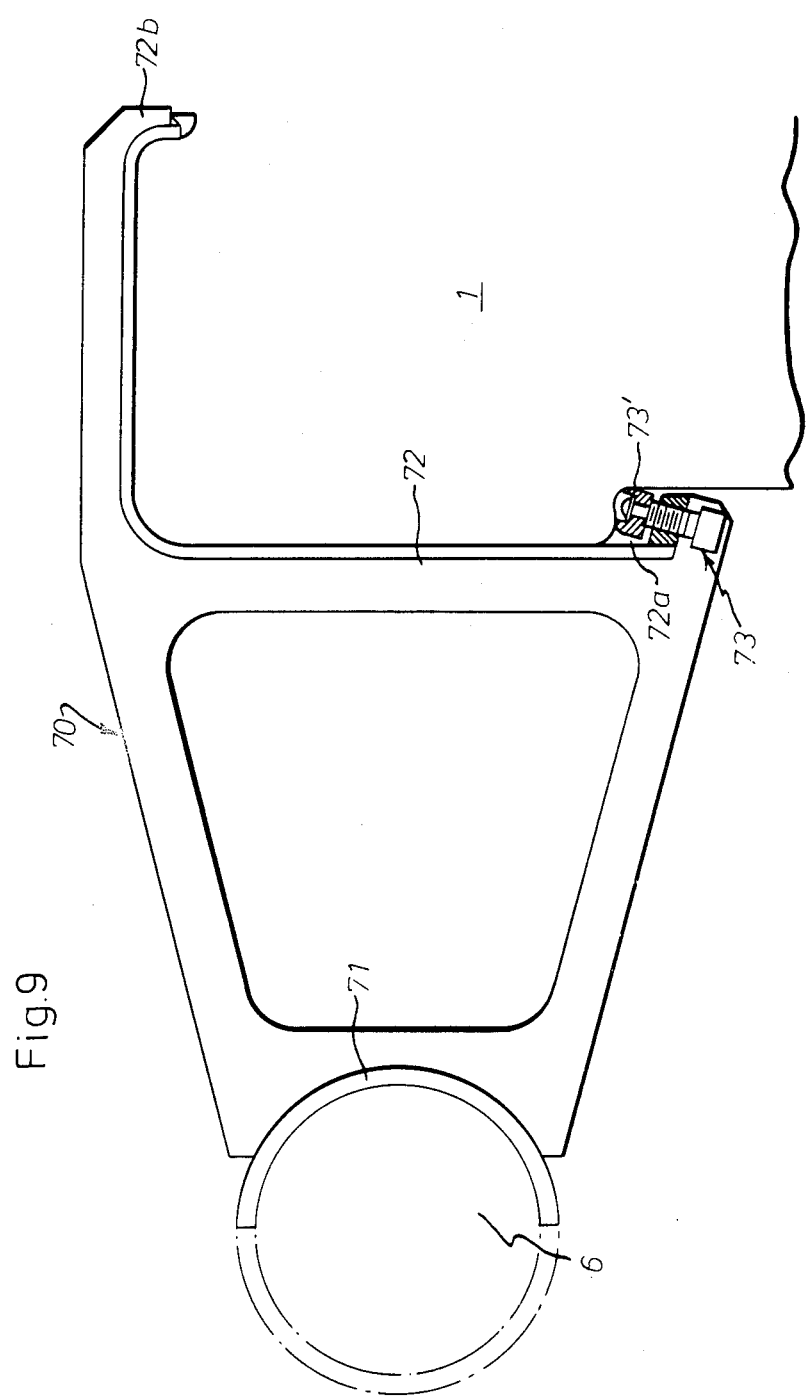
FIG. 9 is a plan view, partly in cross-section, of a supporting device for supporting the lifting device relative to a container while the container is being lifted.

FIGS. 1-5 illustrate various phases in lifting a container 1 from the ground 2 and placing the container on the platform 3 of a transport vehicle, and four identical, hydraulically operated lifting devices 4 of which only two are shown in each of FIGS. 1-4, whereas all four are shown in FIG. 5.

As will appear in detail below, each lifting device 4 comprises a piston and cylinder assembly, for which the working fluid preferably is hydraulic oil, although also other fluids may be used. Furthermore, each lifting device comprises means for releasably connecting the piston and cylinder assembly and preferably its cylinder to a corner portion of a container, such as the container 1 shown. Each piston and cylinder assembly has a slender but sufficiently powerful design and a sufficient length of stroke to provide for lifting of a full container by means of four of the lifting devices 4. Hydraulic operation is preferred for several reason—for example, provide for the necessary hoisting power at a relatively small cylinder diameter and to permit power supply from a conventional, vehicle-borne hydraulic system provided with a hydraulic pump.

The lifting devices 4 according to the invention are designed and intended to be stowed on a transport vehicle during transport in a comparatively limited space, preferably a space arranged as a stowing box 5 under a load supporting platform of the vehicle and accessible from the rear or one side thereof.

Each of the four piston and cylinder assemblies is connected to the container 1 at one of its four corners by a releasable connecting mechanism to be described shortly. The connecting mechanisms permit lifting of the container by extending legs 7 connected to the pistons in the cylinders, when these legs of the assemblies 4 support the assemblies on the ground. When the container is lifted and supported on the vehicle and the pistons with the legs are withdrawn to upper positions, the connecting mechanisms permit the piston and cylinder assemblies to pivot from operative positions in which the assemblies project from the longitudinal sides of the vehicle (FIG. 3) to transport or rest positions (FIGS. 4 and 5) at the front and rear sides of the container.

Thus, in the preferred embodiment, the cylinder 6 of each of the lifting cylinders is movable relative to the piston rod thereof and comprises means for releasably connecting it to the container 1, and the piston rods are adapted to serve as said legs 7 for supporting the cylinder relative to the ground 2, when the container is lifted. Of course, if desired, the cylinders can serve as legs and the piston rods can be equipped with said connecting means.

For lifting of the container 1, the transport vehicle will at first be moved in the direction of the container such that the vehicle rear end is positioned adjacent one of the short sides of the container (FIG. 1). The four lifting devices 4 are taken out from the stowing space 5 on the vehicle, and the piston and cylinder assemblies 6, 7 of the lifting devices are placed in vertical positions at the four corners of the container, the lower ends of the piston rods or legs 7 being provided with support means 8 for support on the ground. These support means preferably are in the form of wheel assemblies (see FIG. 6) to facilitate moving of the lifting devices on the ground.

After the cylinders 6 have been releasably connected to the container at the corners thereof, a hydraulic pump (not shown) on the transport vehicle is connected to a common connection 9 for the four hydraulic cylinders. Then the container 1 is lifted by means of the lifting devices 4 to an appropriate height (FIGS. 2 and 3) to allow the vehicle to be moved from the position in FIG. 2 to the position in FIG. 3 in which the loading platform 3 is situated under the container 1, the hydraulic connection 9 between the hydraulic cylinders and hydraulic conduits 11 connected to the hydraulic pump on the vehicle having previously been disconnected. In FIG. 1, the hydraulic conduits 11 are shown extended from the transport vehicle and connected to the hydraulic cylinders. When backing the vehicle to the position in FIG. 3, the hydraulic conduits 11 may thus be disconnected from the cylinders 6 and retracted into the transport vehicle so as not to interfere with the vehicle movements. When the hydraulic conduits 11 are disconnected, the inner hydraulic systems of the cylinders proper are blocked to prevent hydraulic oil from flowing out of the cylinders under the pistons, thereby preventing the raised container from sinking. For this purpose, conventional stop and lowering valves are arranged and operable manually and preferably centrally via a flow distributor described below and common to the four cylinders, which allows plane parallel lowering of the container. Alternatively, each cylinder may be operated separately.

By opening the lowering valves, the operator, as a rule the vehicle driver, can lower the container 1 from the position in FIG. 3 to rest on the loading platform. By means of the hydraulic system of the transport vehicle, the cylinders can be supplied in the opposite direction such that the piston rods or legs 7 are withdrawn upwards to such a level that the lifting devices 4 may be pivoted by way of connecting mechanisms through about 180° from the position in FIG. 3 to the position in FIGS. 4 and 5, in which foot ends, such as wheel assemblies 8, of the piston rods rest on the loading platform.

This technique is used in such cases where the lifting devices can be accommodated on the loading platform in front of or behind the container, as shown in FIGS. 4 and 5, respectively. If, instead, it is required that the lifting devices 4 be stowed away in some other place on the vehicle, the lifting devices may be released from the container as described later and placed in an accessible stowing space, preferably in the stowing space or box mentioned above and designated 5.

If the lifting devices 4 are transported on the vehicle while still mechanically connected to the container 1, as shown in FIGS. 4 and 5, then when the container is to be put onto the ground, they need only be pivoted to their operative positions shown in FIG. 3 and be supported on the ground by pulling or pushing down the piston rods. If the hydraulic system is not already connected to the cylinders, it should of course first be connected. Then the container is lifted again to the position as shown in FIG. 3, which permits the transport vehicle to be moved to allow placing of the container on the ground, i.e. in the position shown in FIG. 1.

In the preferred embodiment, the apparatus according to the invention provides the above described possibilities of transporting the lifting devices 4, i.e. the piston and cylinder assemblies with the necessary means for pivotable and releasable connection to the container, either on the loading platform or stowed away in a suitable space 5, after the connecting means have been released from the container 1 and preferably from the cylinders 6. If there is sufficient space on the loading platform 3 for placement of the lifting devices as shown in FIG. 4, such placement is of course preferred while transporting the container since this minimizes labor for unloading the container from the transport vehicle.

FIGS. 1, 2, 4 and 5 indicate a flow distributor 10 of known type, for example of the make VÄBYMA, connected to the hydraulic system of the transport vehicle. This flow distributor is capable of transferring and distributing pressurized fluid to the four cylinders 6 such that plane parallel lifting or lowering of a load, i.e. the container 1, is carried out automatically.

While the container 1 is lifted or lowered, the piston rods 7 supported on the ground serve as stable guides for the cylinders movable along the piston rods. As is evident from the following discussion, supplementary support means may also be used to support the cylinders 6 in relation to the container 1 and to prevent, during the lifting operation, unwanted shifting relative to attachment elements of the connecting devices at the container corners.

FIG. 6 shows a complete, preferred piston and cylinder assembly 6, 7 for a lifting device 4 acccording to the invention. The piston rod 7 constituting the leg of the lifting device is connected at its lower end to a wheel assembly 12 comprising two transport wheels 12', and a support plate 13. The pressure fluid connection, designated 14, communicates via a duct 15 with the cylinder space 16 above a main piston 17 via a pressure-operated non-return valve 18 in a duct system 19 in the piston 17. The non-return valve 18 is opened automatically in a conventional manner by the pressure in the duct 15 for lifting the cylinder, and closes automatically when the pressure in the duct 15 ceases, which prevents the return flow of oil. However, the non-return valve 18 may be forced to open (thus opening duct 15) by a piston a control rod 20' of piston 20 which is movable between abutments 21, 22 in a control cylinder 23 formed by a bore in the main piston 17. By means of a control fluid (hydraulic oil) which is fed into the control cylinder 23 through a duct 24 extending parallel to the dut 15 in the hollow piston rod 7 and having a connection 25 adjacent the connection 14 at the cylinder lower end, the control piston 20 can be moved from the position shown in FIG. 6 in a direction toward a movable member, such as a ball, of the non-return valve such that piston rod 20' pushes the valve member from a closed position (FIG. 6), thereby opening duct 15. From the control cylinder, a duct 26 extends in the main piston 17 to an annular space 27 between the main cylinder an the main piston. By reversing a valve (not shown) in the hydraulic system of the vehicle, hydraulic oil can be supplied through the duct 24 to the control cylinder 23 from which the hydraulic oil is transferred to the annular space 27 to act against the underside of the main piston. Simultaneously, the hydraulic oil in the control cylinder 23 moves the control piston 20 to the right such that the non-return valve 18 opens and thus provides a return circuit from the upper cylinder space 16 via the duct 15. This arrangement allows the main cylinder to be moved downwards in the direction of the main piston, regardless of whether or not a load is acting on the main cylinder upper end.

Thus, the cylinder is a double-acting cylinder, but the active piston area is considerably larger on the top side than on the bottom side of the piston.

The main cylinder 6 has a reinforced lower end portion 30 for connection to the container as described below.

FIG. 7 shows one of four similar connecting devices for releasably connecting the four cylinders to the four corners of the container to be lifted. Each connecting device comprises an intermediate member in the form of a bracket 31 which at opposite ends supports mounting means for releasably connecting it to the respective cylinder and the respective container corner. Such connecting means include, at the end of the bracket 31 facing the lifting cylinder 6, a clamping element 32 having a semi-cylindrical seat for clamping the lower reinforced end portion of the main or lifting cylinder 6 firmly against a corresponding semi-cylindrical seat at this end of the cylinder for embracing the latter.

At one lateral end, the clamp 32 is hingedly connected to the bracket 31 by a pin bolt 34 (FIG. 8) and, at the other end, the clamp is releasably connected to the bracket by appropriate means, such as an eccentric bolt 35, a screw bolt or bolt and nut means. At its end facing away from the cylinder 6, the bracket 31 is releasably connected to a vertical corner of the container FIGS. 7 and 8 show only a lower container corner portion in the form of a so-called corner end box or corner case 1a of the type which is common in standard containers at the upper and lower end of each vertical corner to permit lifting and anchoring of the container. The bracket is secured to the lower corner end box 1a by an attachment 37 consisting of a box-shaped, welded construction of steel plates comprising horizontal upper and lower plates 37a, 37b. Attachment 37 serves as a hinge member and has a center bore for receiving a guide and pivot pin 38 which is insertable in and withdrawable from corresponding bores in two parallel arms 39a, 39b rigedly fixed to the bracket 31 and forming part of the hinge. Between these arms, the attachment 37 which forms another part of the assembled hinge, is received with a small clearance which is partially compensated for by a washer 40 (FIG. 7). After mounting of the bracket 31 on the attachment 37, which is preferably releasably secured to the lower corner end box 1a, the bracket is pivotable on hinge pin 38 through about 180° from the position shown in FIG. 8, in which two mutually perpendicular bracket surfaces 41a, 41b embrace two planar and mutually perpendicular faces of the lower corner end box 1a on either side thereof and thus on either side of the corner 42. The arms 39a, 39b connected to the bracket and serving as a hinge mounting are formed with circular outer end surfaces 43 centered on the longitudinal axis of the hinge pin 38, and the radius of said end surfaces substantially corresponds to half the width of the arms 39a, 39b. The position of the bracket 31 in FIG. 8 corresponds to the position of the bracket 31 in FIG. 3. The position of the bracket 31 in FIGS. 4 and 5 is obtained by pivoting the bracket 31 in FIG. 8 counter-clockwise through about 180° such that the side 41c opposed to the side designated 41b of the hinge mounting engages with the corner end box 1a and lies close to or at a slight distance from one container short side of which a small portion is shown in FIG. 8 at 1b.

The bracket 31 can be locked in each of the above described positions by means of a pin 45 which in FIG. 7 is shown inserted in two opposite bore 46 in the plates 37a, 37b and in the arms 39a, 39b of the hinge mounting of the attachment 37. When the bracket 31 is pivoted through 180° from the position shown in FIGS. 7 and 8 the bores 46 register with the bores 47 and the bracket can be releasably locked in this position by inserting the pin 45 in these registering bores.

As shown in FIGS. 7 and 8, the bracket 31 is of lightweight construction since it is provided with recesses 48a–d at such points where they do not materially reduce the strength of the construction, which preferably is made of welded steel plates.

To prevent the bracket 31 from sliding relative to the cylinder 6 when secured thereto by means of the clamp 32, the semi-cylindrical clamp 32 and the semi-cylindrically shaped end 31' of the bracket facing the clamp 32 have upper edge flanges 32', 31" for engagement with a shoulder constituted by the reinforced portion 30 of the main cylinder.

In the operative position of the bracket 31 shown in FIG. 8, which is the lifting position, the bracket 31 is safely locked by locking means generally designated 50 and comprising a block 51 insertable in the corner end box 1a through an opening 52 in the wall thereof facing the bracket. Furthermore, the locking means 50 comprises another block 54 which is attached to a bracket portion and is accessible through, for example, the recess designated 48a in FIG. 8. In corresponding bores in the blocks 51, 54, of which the bore in the block designated 51 is threaded, a clamping screw 55 can be inserted and tightened. In the preferred embodiment as shown, the blocks 51 and 54 thus constitute a pair of are clamps on either side of a corner box wall and clamped thereagainst by means of the screw 55. The elements 51, 54, 55 forming this clamping device are operable as a unit which is positionable in the working position described above with the blocks on either side of a vertical bracket wall 49 and the adjacent wall of the container corner box 1a. The clamping block 51 has a sector-shaped groove (not shown) for engagement with a pin 56 fixed to the cooperating clamping block 54 and is pivotable through about 90°, by means of the screw, to engage the inner side of said corner box wall. By means of a screw 57 which is inserted in a bore in the clamping block 51 and which acts, via a friction washer (not shown), upon the clamping screw 55, the clamping block 51 can be frictionally secured to the screw such that pivoting of the clamping block 51 through 90° relative to the cooperating clamping block 54 may be readily accomplished by means of the screw 55 upon mounting of the assembly 51, 54, whereupon the screw 55 is tightened for clamping and locking.

The attachment 37 may be releasably connected to the container corner box 1a by means of a clamping block 60 (FIG. 8) and a clamping screw bolt 61 (FIG. 7) or, optionally, in the same manner in which the clamping block 51 is clamped to the container box for clamping the latter to the bracket 31.

To stabilize the piston and cylinder assemblies 6, 7 and to prevent excessive shifting movements and possible damage of said assemblies and the associated container attachment when heavily loaded containers are lifted, an upper support is provided to support each cylinder relative to the adjacent container corner. In a preferred embodiment, the support is in the form of a yoke 70 (FIG. 9) comprising a welded construction of steel plates having a semi-cylindrical seat 71 for support against the circumferential surface of the cylinder and having a foot which includes a base plate 72, the legs of which are formed as a hook for embracing a corner portion of the container 1. The outer end of one leg supports an abutment to cooperate with a shoulder formed where a facing corner box wall merges with the adjacent container end wall. In particular, a clamping screw 73 is supported in a threaded bore 73' of a boss 72a, the inner end of the clamping screw being formed to serve as an abutment to be pressed against the shoulder mentioned above. The other leg of the hook has its outer end 72b formed to engage a shoulder where a side wall of the container corner box merges with an adjacent longitudinal container wall. As shown in FIG. 9, the base plate 72 thus embraces the corner box. On lifting the container by means of the lifting devices 6, 7, each cylinder will be inclined against the semi-cylindrical seat 71 of the yoke 70, thus minimizing resilient movements of the brackets 31 and the connecting devices.

With the above described construction of the connecting devices between the lifting devices 6, 7 proper and the adjacent vertical container corners, the lifting devices can be readily connected to and disconnected from the container. On disconnection, the connection between the blocks 51 and 54 is released, and this may be carried out quickly with simple tools, since the screw 55 is easily accessible. The hinge mounting 39 is quickly released from the container attachment 37 by extracting the guide pin 38 and the lock pin 45 which may then be reinserted in the bores of the hinge mounting so that they are easily available for use next time. Thus, the mounting of the four container attachments 37 is very simple, and when a container has been unloaded, it is easy to disconnect and recover them. Also when desired, the brackets are easily disconnectible from the cylinders. To this end, only the eccentric bolt 35 need be turned and the clamping member 32 opened.

After disconnection, the relatively low weight of the lifting and connecting devices and the parts thereof will allow them to be lifted manually and positioned in appropriate stowing spaces on the transport vehicle.

It will be appreciated that, upon connection of the four lifting and connecting devices according to the invention to a container and subsequent lifting of the container by means of the lifting devices, it is possible to move the container on the ground since the container with the lifting devices constitutes in effect a carriage having wheel assemblies and wheels at its four corners. Wheel assemblies 12 preferably are pivotable relative to the cylinders, and the support blocks may optionally be clamped to the cylinders by clamps similar to the clamp 32 in FIG. 8. To bring wheels 12' into contact with the ground, support plate 13 may be retracted by any suitable mechanism, as is well known in the art, such that each wheel 12' projects through a corresponding opening 13' in the plate. This arrangement of the container as a carriage may in some cases facilitate loading and unloading when the container is placed or is to be placed such that driving up or reversing the vehicle into the right position is complicated. To move the "container carriage" on the ground, a hoist on the transport vehicle may be useful. In this case, the lifting devices and the associated equipment should have a more powerful construction than if they are to be used only for the described loading and unloading operations, and the wheel assemblies should be arranged such that they can be brought in parallel and, optionally, can be steered.

The above described construction of the details of a preferred lifting device and the corresponding connecting device for releasably securing it to the lower end portion of a vertical container corner should be regarded primarily as a preferred example of an embodiment in order to implement the described container-handling system according to the invention. The system utilizes four lifting devices which may be easily connected, disconnected, operated and handled by one person, e.g. for lifting and placing a container on a pallet or a movable load-carrier which can be moved-in under the hoisted container between the lifting assemblies and especially for loading and unloading of containers onto and from a load-supporting platform of a transport vehicle on which the lifting devices may be transported when disconnected from the container.

What I claim and desired to secure by Letters Patent is:

1. Apparatus for lifing a container of the type including four vertical end corners each having a lower corner connecting box with horizontal and vertical surfaces provided with respective openings adapted to serve as anchoring means, said apparatus comprising:

four hydraulic lifting devices, four mechanical connecting devices corresponding to said hydraulic lifting devices for connecting the respective lifting devices each to a corresponding connecting box of said container, and conduit means for connecting said hydraulic lifting devices to a power supply, each lifting device comprising a hydraulic piston and cylinder assembly including a rod fixed to the piston of said assembly and extending out of the cylinder to serve as a retractable supporting leg when said assembly is in an operative position with a longitudinal axis of said assembly substantially vertically positioned, each mechanical connecting device comprising an intermediate member, clamping means supported by one end of said intermediate member for clamping said intermediate member to the respective cylinder of the corresponding lifting device, and releasable attachment means supported by an opposite end of said intermediate member for releasably attaching said intermediate member to said corresponding connecting box, said attachment means of said connecting device comprising releasable clamping members for releasably clamping said intermediate member to said corresponding connecting box, securing means for releasably securing said clamping members in clamped condition to said corresponding connecting box, hinge means including relatively pivotable and disconnectible first and second hinge members, and pivot means connecting said hinge members in such a manner as to permit pivotal movement of said intermediate member about an axis parallel to said longitudinal axis of said assembly when said clamping members are released from said corresponding connecting box and thereby to permit pivotal movement of said intermediate member with the corresponding lifting device connected thereto between angularly spaced operative and rest positions, said first hinge member being fixed to said intermediate member, said attachment means further comprising means for releasably connecting said second hinge member to said corresponding connecting box, including a block which is insertable into said connecting box through one said opening thereof, means for connecting said block to said second hinge member, and means for firmly clamping said block against an inner side of said corresponding connecting box, and releasable locking means for locking said first hinge member relative to said second hinge member in either of two angularly spaced positions corresponding respectively to said operative and rest positions of the corresponding lifting device.

2. Apparatus according to claim 1, wherein said first hinge member is dimensioned relative to said second hinge member and said corresponding connecting box in such a manner as to permit unobstructed pivotal movement of said intermediate member through at least about 180°.

3. Apparatus according to claim 1, wherein said pivot means of said attachment means comprises alignable vertical bores in said first and second hinge members and a guide and pivot pin removably insertable in the aligned bores.

* * * * *